United States Patent
Keen

[11] 3,897,922
[45] Aug. 5, 1975

[54] FISHING POLE HOLDER
[75] Inventor: Oswald R. Keen, Arcadia, Fla.
[73] Assignee: The Raymond Organization, Inc., New York, N.Y.
[22] Filed: Aug. 28, 1973
[21] Appl. No.: 392,281

[52] U.S. Cl. .................................................. 248/42
[51] Int. Cl. ............................................... A47g 21/14
[58] Field of Search ............ 248/38, 39, 40, 41, 42

[56] References Cited
UNITED STATES PATENTS

| 655,951 | 8/1900 | Bates | 248/42 |
| 1,577,612 | 3/1926 | Dees | 248/38 |
| 2,311,823 | 2/1943 | Gaskill | 248/42 X |
| 2,632,616 | 3/1953 | Heistand | 248/42 |
| 2,985,414 | 5/1961 | Ince | 248/42 |
| 3,708,141 | 1/1973 | Friedgen | 248/42 |

FOREIGN PATENTS OR APPLICATIONS
963,242  7/1964  United Kingdom................ 248/44

Primary Examiner—William M. Schultz
Attorney, Agent, or Firm—Daniel Jay Tick

[57] ABSTRACT

A fishing pole holder comprises a pivot arm extending from a plate substantially coplanarly therewith whereby the plate is rotatable around the axis of the pivot arm. The pivot arm is affixed to the plate in a manner whereby the plate is rotatable in its own plane to a predetermined extent relative to the pivot arm. Clamps are mounted on the plate for clamping a fishing pole in position in a plane substantially parallel to the plane of the plate. A supporting device pivotally supports the pivot arm.

3 Claims, 5 Drawing Figures

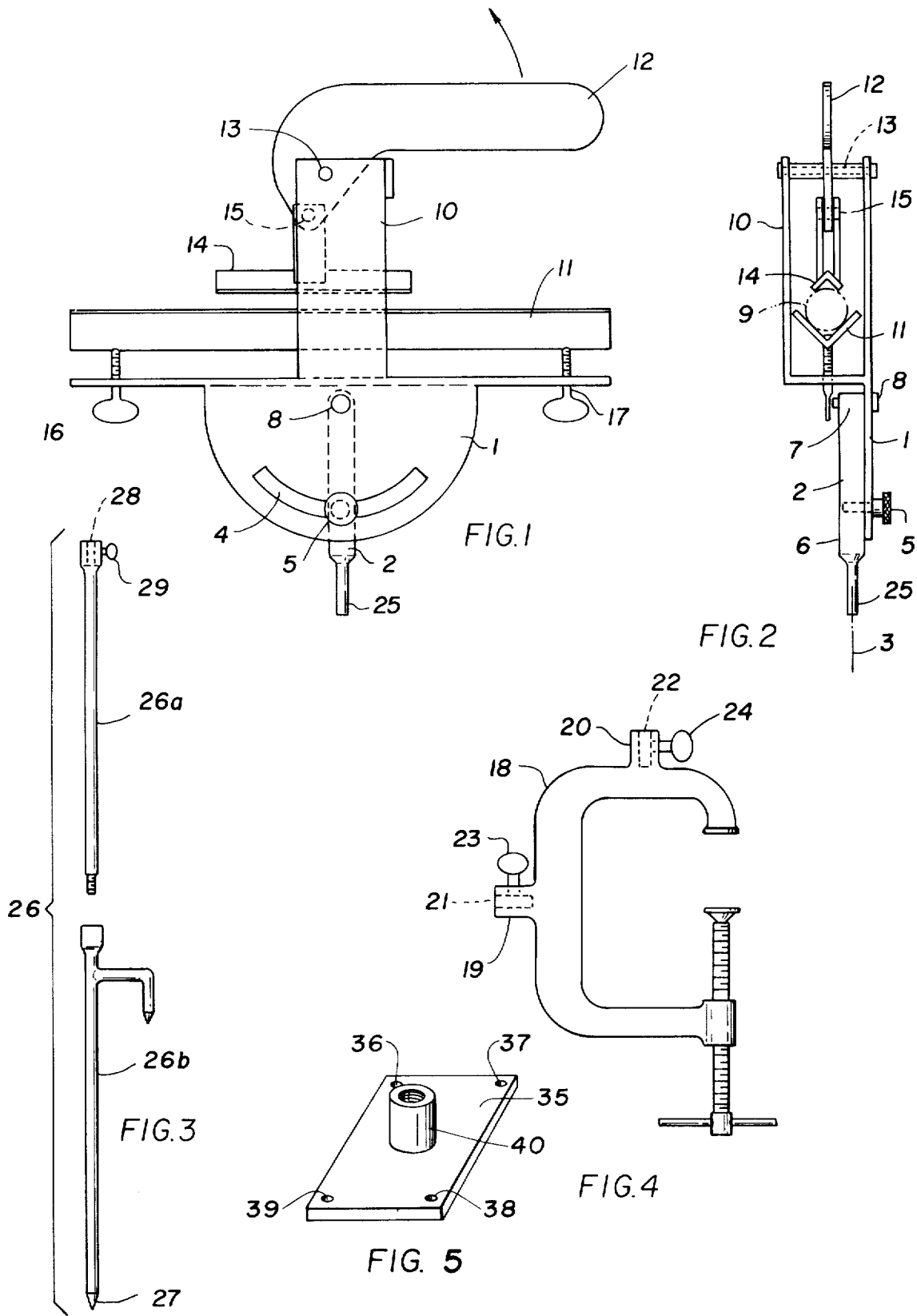

1

FISHING POLE HOLDER

DESCRIPTION OF THE INVENTION

The present invention relates to a fishing pole holder.

The principal object of the invention is to provide a fishing pole holder of simple, but sturdy, effective and reliable structure, for supporting a fishing pole of any suitable size in any desired position about a vertical axis and at a desired inclination, within a predetermined range, relative to a vertical axis, which fishing pole holder is simple, convenient and easy to use.

In order that the invention may be readily carried into effect, it will now be described with reference to the accompanying drawing, wherein:

FIG. 1 is a side view of an embodiment of the fishing pole holder of the invention;

FIG. 2 is a front view of the embodiment of FIG. 1;

FIG. 3 is a front view of an embodiment of a supporting device of the fishing pole holder of the invention;

FIG. 4 is a front view of another embodiment of the supporting device of the fishing pole holder of the invention; and FIG. 5 is a schematic diagram of a stanchion for supporting the fishing pole holder of the invention on a deck or surface.

In the FIGS., the same components are identified by the same reference numerals.

The fishing pole holder of the invention comprises a plate 1 (FIGS. 1 and 2). A pivot arm 2 (FIGS. 1 and 2) extends from the plate 1 substantially coplanarly therewith whereby the plate is rotatable around the axis 3 (FIG. 2) of the pivot arm. The pivot arm 2 is affixed to the plate 1 in a manner whereby the plate is rotatable in its own plane to a predetermined extent relative to the pivot arm. The extent of rotation is approximately 90°.

The plate 1 has an arcuate cutout 4 (FIG. 1). The arcuate length of the cutout 4 is approximately 90°, the cutout extending approximately 45° from each side of the center of the plate 1. A releasable clamp 5 (FIGS. 1 and 2) is affixed to an intermediate point 6 (FIG. 2) of the pivot arm 2 and is guided in the cutout 4. An end 7 (FIG. 2) of the pivot arm 2 is pivotally affixed to the plate 1 via a pivot pin 8 (FIGS. 1 and 2). The plate 1 may thus be rotated about the pivot pin 8 of the pivot arm 2 by loosening the clamp 5. When the plate 1 is at a desired elevation, the clamp 5 is tightened, thereby holding it at its desired elevation.

A clamping device is mounted on the plate 1 for clamping a fishing pole 9 (FIG. 2) in position in a plane substantially parallel to the plane of the plate, as shown in FIG. 2. The clamping device comprises a frame 10 (FIGS. 1 and 2) affixed to the plate 1. A substantially elongated, substantially V-shaped cross-sectioned first clamping member 11 (FIGS. 1 and 2) is adjustably mounted in the frame 10 in a plane substantially parallel to the plane of the plate 1. A handle 12 (FIGS. 1 and 2) is pivotally affixed to the frame 10 via a pivot pin 13 (FIGS. 1 and 2). A substantially V-shaped, cross-sectioned second clamping member 14 (FIGS. 1 and 2) is pivotally affixed to the handle 12 via a pivot pin 15 (FIGS. 1 and 2) in a manner whereby the rod is rotatable in the frame 10 to selectively move the second clamping member into and out of operative clamping proximity with the first clamping member 11.

The first clamping member 11 is adjustably mounted in the frame 10 via a pair of wing bolts 16 and 17.

A support device pivotally supports the pivot arm 2. In the embodiment of FIG. 4, the supporting device comprises a C-type clamp 18 having a pair of extending portions 19 and 20 thereon spaced from each other at substantially right angles to each other. Bores 21 and 22 are formed in the extending portions 19 and 20, respectively. A wing bolt 23 is threadedly engaged in the extending portion 19 at right angles to and extending into the bore 21 formed therein. A wing bolt 24 is threadedly engaged in the extending portion 20 at right angles to and extending into the bore 22 formed therein. The end 25 (FIGS. 1 and 2) fits into either bore 21 or 22 and is clamped tightly therein in operation.

The supporting device of the embodiment of FIG. 3 comprises an elongated rod 26, which may be provided in two sections 26a and 26b to facilitate packing and carrying thereof. The rod 26 is adapted to be driven into the ground having a point 27 at one end thereof to facilitate this. The rod has a substantially coaxial bore 28 formed therein at the other end thereof from its point 27. A wing nut 29 is threadedly engaged in the rod at right angles to and extending into the bore 28 formed therein. The end 25 of the pivot arm 2 fits into the bore 28 and is tightened therein by the wing bolt 29. The rod 26 may be driven into a beach, sand, ground, or the like.

FIG. 5 is a stanchion for supporting the fishing pole holder of the invention on a deck or surface. The stanchion comprises a plate 35 adapted to be affixed to a deck or surface via bores 36, 37, 38 and 39. An internally threaded cylindrical member 40 is perpendicularly affixed to the center of the plate 35 for supporting the fishing pole holder.

While the invention has been described by means of specific examples and in specific embodiments, I do not wish to be limited thereto, for obvious modifications will occur to those skilled in the art without departing from the spirit and scope of the invention.

I claim:

1. A fishing pole holder, comprising
   a plate;
   a pivot arm extending from the plate substantially coplanar therewith whereby the plate is rotatable around the axis of the pivot arm;
   fastening means affixing the pivot arm to the plate in a manner whereby the plate is rotatable in its own plane to a predetermined extent relative to the pivot arm, the fastening means comprising an arcuate cutout in the plate, a releasable clamp on an intermediate point of the pivot arm guided in the cutout and a pivot pin at an end of the pivot arm pivotally affixing the pivot arm to the plate;
   clamping means mounted on the plate for clamping a fishing pole in position in a plane substantially parallel to the plane of the plate, the clamping means comprising a frame affixed to the plate, a substantially elongated substantially V-shaped cross-sectioned first clamping member adjustably mounted in the frame in a plane substantially parallel to the plane of the plate, a handle pivotally affixed to the frame and a substantially V-shaped cross-sectioned second clamping member pivotally affixed to the handle in a manner whereby the handle is rotatable in the frame to selectively move the second clamping member into and out of operative clamping proximity with the first clamping member; and supporting means for pivotally supporting the pivot arm.

2. A fishing pole holder as claimed in claim 1, wherein the supporting means comprises a C-type clamp adapted to be removably affixed to an object and having a pair of extending portions thereon spaced from each other and having bores formed therein at substantially right angles to each other and a pair of wing bolts each threadedly engaged in a corresponding one of the extending portions at right angles to and extending into the bore formed therein.

3. A fishing pole holder as claimed in claim 1, wherein the supporting means comprises an elongated rod adapted to be driven into the ground and having a substantially coaxial bore formed therein and a wing bolt threadedly engaged therein at right angles to and extending into the bore formed therein.

* * * * *